(12) United States Patent
Kouno et al.

(10) Patent No.: US 10,570,959 B2
(45) Date of Patent: Feb. 25, 2020

(54) OIL-RETAINING SINTERED BEARING AND METHOD OF PRODUCING THE SAME

(71) Applicants: MITSUBISHI MATERIALS CORPORATION, Tokyo (JP); DIAMET CORPORATION, Niigata-shi (JP)

(72) Inventors: Hajime Kouno, Kitamoto (JP); Yoshinari Ishii, Niigata (JP); Jyun Katou, Kitamoto (JP)

(73) Assignees: MITSUBISHI MATERIALS CORPORATION, Tokyo (JP); DIAMET CORPORATION, Niigata-shi (JP)

( * ) Notice: Subject to any disclaimer, the term of this patent is extended or adjusted under 35 U.S.C. 154(b) by 0 days.

(21) Appl. No.: 16/064,992

(22) PCT Filed: Dec. 20, 2016

(86) PCT No.: PCT/JP2016/087885
§ 371 (c)(1),
(2) Date: Jun. 21, 2018

(87) PCT Pub. No.: WO2017/110778
PCT Pub. Date: Jun. 29, 2017

(65) Prior Publication Data
US 2019/0003527 A1  Jan. 3, 2019

(30) Foreign Application Priority Data

Dec. 25, 2015 (JP) .................... 2015-254810

(51) Int. Cl.
*F16C 33/10* (2006.01)
*F16C 17/02* (2006.01)
*F16C 33/14* (2006.01)

(52) U.S. Cl.
CPC .......... *F16C 33/104* (2013.01); *F16C 17/026* (2013.01); *F16C 33/145* (2013.01);
(Continued)

(58) Field of Classification Search
CPC .................................... F16C 33/104
See application file for complete search history.

(56) References Cited

U.S. PATENT DOCUMENTS 3,140,131 A * 7/1964 Tann .............. F16C 33/103
                                                    384/279
3,445,148 A * 5/1969 Harris et al. ........ B22F 3/1109
                                                    29/898.054
(Continued)

FOREIGN PATENT DOCUMENTS

JP    04-307111 A    10/1992
JP    05-115146 A    5/1993
(Continued)

OTHER PUBLICATIONS

International Search Report dated Apr. 4, 2017 for the corresponding PCT Patent Application No. PCT/JP2016/087885.
(Continued)

*Primary Examiner* — Thomas R Hannon
(74) *Attorney, Agent, or Firm* — Leason Ellis LLP

(57) ABSTRACT

An oil-retaining sintered bearing in which friction coefficient can be reduced and a sliding property as a bearing can be improved by supplying a sufficient amount of oil to a sliding surface and preventing the supplied oil from moving to an interior from the sliding surface; a sliding surface 3 supporting an outer peripheral surface of a shaft and a helical oiling surface 4 around a shaft axis of a bearing hole are adjacently formed on an inner peripheral surface of the bearing hole into which the shaft is inserted; a surface open
(Continued)

rate at the sliding surface 3 is not larger than 10%; and a surface open rate at the oiling surface exceeds 10%.

5 Claims, 5 Drawing Sheets

(52) U.S. Cl.
CPC ...... *F16C 2202/52* (2013.01); *F16C 2204/10* (2013.01); *F16C 2220/20* (2013.01)

(56) References Cited

U.S. PATENT DOCUMENTS

| | | | | |
|---|---|---|---|---|
| 4,290,655 | A | * 9/1981 | Apuzzo | F16C 33/103 |
| | | | | 384/286 |
| 5,120,140 | A | * 6/1992 | Nakagawa | B22F 3/1109 |
| | | | | 384/279 |
| 5,945,050 | A | * 8/1999 | Jeong | B22F 3/1109 |
| | | | | 264/119 |
| 6,244,749 | B1 | 6/2001 | Nakagawa et al. | |
| 6,299,356 | B1 | 10/2001 | Okamura et al. | |
| 7,922,393 | B2 | * 4/2011 | Vogt | F16C 33/103 |
| | | | | 384/279 |
| 2003/0206670 | A1 | * 11/2003 | Maruyama | F16C 33/103 |
| | | | | 384/279 |
| 2005/0286822 | A1 | 12/2005 | Maruyama et al. | |
| 2013/0121627 | A1 | 5/2013 | Jun | |
| 2016/0223016 | A1 | 8/2016 | Ito et al. | |

FOREIGN PATENT DOCUMENTS

| | | |
|---|---|---|
| JP | 09-49047 A | 2/1997 |
| JP | 09-49062 A | 2/1997 |
| JP | 09-49064 A | 2/1997 |
| JP | 09-250465 A | 9/1997 |
| JP | 10-113832 A | 5/1998 |
| JP | 11-61204 A | 3/1999 |
| JP | 11-293304 A | 10/1999 |
| JP | 3094869 U | 4/2003 |
| JP | 2006-9846 A | 1/2008 |
| JP | 2008-275115 B | 11/2008 |
| WO | WO-02/40880 A | 5/2002 |
| WO | WO-2010/080281 A | 7/2010 |
| WO | WO-2015/050200 A | 4/2015 |

OTHER PUBLICATIONS

Extended European Search Report dated Jun. 26, 2019 for the corresponding European Patent Application No. 16878667.1.

* cited by examiner

OIL-RETAINING SINTERED BEARING AND METHOD OF PRODUCING THE SAME

CROSS-REFERENCE TO RELATED PATENT APPLICATIONS

This application is a U.S. National Phase Application under 35 U.S.C. § 371 of International Patent Application No. PCT/JP2016/087885 filed on Dec. 20, 2016 and claims the benefit of Japanese Patent Application No. 2015-254810, filed Dec. 25, 2015, all of which are incorporated herein by reference in their entireties. The International Application was published in Japanese on Jun. 29, 2017 as International Publication No. WO/2017/110778 under PCT Article 21(2).

BACKGROUND OF THE INVENTION

Technical Field

The present invention relates to an oil-retaining sintered bearing in which smooth lubrication can be performed by impregnating lubricant oil therein and a producing method thereof.

Background Art

An oil-retaining sintered bearing is used in a state in which pores are impregnated with lubricant oil. When a shaft is rotated, the lubricant oil is exuded from the bearing between the shaft and a sliding surface of the bearing so as to support the shaft by pressure of the lubricant oil generated along with the rotation of the shaft. The oil-retaining sintered bearing is broadly used as a bearing for an in-vehicle motor and the like because it can be used for long time without oiling by such a lubrication property.

In this oil-retaining sintered bearing, in order to appropriately generate the pressure of the lubricant oil on the sliding surface, a means to reduce a leak of the lubricant oil from the sliding surface and the like are applied by increasing a passage resistance of the lubricant oil by sealing a part of the pores or reducing sizes of the pores in the bearing.

For example, Japanese Unexamined Publication No. H04-307111 discloses a method of producing an oil-retaining sintered bearing by forming a pressurized powder body and then sintering it: when the pressurized powder body is formed, a penetrated hole to be a bearing hole is formed by using a rod: the rod has a roughened part with a surface roughness larger than that of the other part on a part of an outer peripheral surface; the roughened part is formed along a shaft direction: so that the pores at an inner peripheral surface of the penetrated hole which are in contact with the roughened part are crushed. In this oil-retaining sintered bearing, the shaft is held at a part of the inner peripheral surface in which the pores are crushed in the bearing hole: oil is exuded from the other part than the part in which the pores are crushed of the inner peripheral surface, and supplied to the inner peripheral surface at which the pores are crushed.

In this case, the roughened part is formed in a belt shape along the shaft direction of the rod: accordingly, a part around the pores are pressed by the roughened part of the rod when the powder is pressurized and formed, and they plastically flow into the pores and are crushed. Moreover, it is described that a part in contact with the roughened part is formed to be slightly protruded, and flattened with the inner peripheral surface of the bearing hole by being pressurized by sizing.

Japanese Unexamined Publication No. H05-115146 discloses an oil-retaining sintered bearing in which step parts to be sliding surfaces are formed on an inner peripheral surface of a bearing hole along a circumferential direction so that spaces are formed between bottom surfaces of groove parts between the step parts adjacent to each other and a shaft; and aeration at the sliding surfaces of the step parts is smaller than aeration at the inner peripheral surface of the bearing hole. In this case, the aeration at the sliding surfaces of the step parts is set to be $3\times10^{-10}$ cm$^2$, the aeration at the bottom surfaces of the groove parts is set to be $30\times10^{-10}$ cm$^2$, and height of the step parts is set to be 0.02 mm. As means to reduce the aeration at the sliding surfaces of the step parts, sealing by filling up, plating, or coating are exemplified. It is described that, in this oil-retaining sintered bearing, the shaft is in contact with the sliding surfaces of the step parts but is not in contact with the bottom surfaces of the groove parts having the larger aeration, so that a prescribed amount of oil can be drawn and discharged at the groove parts, and dynamic pressure can be generated in a space surrounded by the groove parts and the shaft.

Technical Problem

Japanese Unexamined Publication No. H04-307111 does not specifically describe aeration at the surface formed by the roughened part or the other surfaces. If the aeration is in a degree described in Japanese Unexamined Publication No. H05-115146, it is difficult to reduce the leakage of the oil from the sliding surfaces while supplying sufficient oil as a bearing in operation in a high-speed rotation or the like, seizing and the like may be generated.

The present invention is achieved in consideration of the above circumstances, and has an object to improve sliding property as a bearing by reducing friction coefficient, by supplying sufficient amount of oil to a sliding surface and preventing the supplied oil from moving inside from the sliding surface.

SUMMARY OF THE INVENTION

Solution to Problem

In an oil-retaining sintered bearing of the present invention, a sliding surface supporting an outer peripheral surface of a shaft and an oiling surface are adjacently formed on an inner peripheral surface of a bearing hole into which the shaft is inserted; a surface open rate at the sliding surface is not larger than 10%; and a surface open rate at the oiling surface is larger than 10%.

In this oil-retaining sintered bearing, oil is exuded from the oiling surface and introduced between the shaft and the sliding surface; and the surface open rate at the sliding surface is not larger than 10%: an oil film is formed between the shaft and it is possible to reduce friction coefficient. In this case, if the surface open rate at the sliding surface supporting the shaft is larger than 10%, the oil cannot be held and it flows into the bearing: so that the oil film is reduced between the shaft and the sliding surface and seizing may be incurred. If the surface open rate of the oiling surface is not larger than 10%, it is difficult to supply the oil from inside sufficiently. Here, the surface open rate is an area rate of a surface.

In the oil-retaining sintered bearing of the present invention, it is preferable that the oiling surface be formed helically around a shaft axis of the bearing hole.

The shaft which is inserted in the bearing hole is generally applied a load in a radial direction, so that it approaches one direction of the bearing hole. A direction of the shaft axis and a direction of the helical cross each other because the oiling surface is helically formed. Accordingly, it is possible to support the shaft surely at the sliding surface, and the support of the shaft can be sure.

In the oil-retaining sintered bearing of the present invention, it is preferable that the sliding surface be formed at both ends of the inner peripheral surface of the bearing hole on whole circumference.

In a case in which the oiling surface is formed on both the end parts of the bearing hole so as to pass through between the both ends of the bearing, the oil leaks from the oiling surface to both the ends of the bearing, so that the oil is less supplied to the sliding surface. According to the present invention, since the sliding surface is formed at both the ends of the inner peripheral surface of the bearing hole on whole circumference, the oil is not leaked to both the ends of the bearing, and the oil can be supplied efficiently from the oiling surface to the sliding surface.

In the oil-retaining sintered bearing of the present invention, when a length of the bearing hole is "b", a helical angle of the oiling surface to the shaft axis is "θ", a width of the oiling surface is "W", and an area rate of the sliding surface is "a", it is preferable that $\sin \theta \geq (W/((1-a)\times b))$ and "a" be not smaller than 0.4 and smaller than 1.0.

Since dimensions are set to satisfy this formula, whichever part of the inner peripheral surface of the bearing hole is in contact with the shaft, the sliding surface is in contact in a range of (a×100) % of the length of the bearing hole, so that the shaft can be stably held. The area rate of the sliding surface is a rate of an area of the sliding surface to an area of whole inner peripheral surface of the bearing hole.

A method of producing an oil-retaining sintered bearing according to the present invention includes a forming step of a pressurized powder body forming a pressurized powder body by filling and pressurizing material powder in a cylindrical space between a die plate and a core rod of a die; a sintering step sintering the pressurized powder body; a reforming step reforming an inner peripheral surface and an outer peripheral surface of the pressurized powder body after sintering; a giving step of an oiling surface forming the oiling surface on the inner peripheral surface of the pressurized powder body after reforming. In this producing method, in the forming step of the pressurized powder body, flat-shape powder and granular powder are mixed as the material powder and filled, and pressurized in a state in which the flat-shape powder is concentrated on an outer peripheral surface of the core rod; in the reforming step, a dense layer is formed by plastically flowing an inner peripheral surface of the pressurized powder body so as to reduce a surface open rate of the inner peripheral surface; and in the giving step of the oiling surface, the oiling surface is formed by removing the dense layer.

The giving step of the oiling surface can be performed by cutting, broaching, etching or the like. It may be performed at the same time with the reforming step; e.g., performing a broaching process while a pulling-off process of the reforming step.

The pressured powder body is formed in a state in which flake powder mixed in the material powder is concentrated on the outer peripheral surface of the core rod, so it is possible to obtain the pressured powder body in which the surface open rate is small at the inner peripheral surface. Further performing the reforming step to make the inner peripheral surface of the pressurized powder body plastically flow, the pores on the inner peripheral surface are filled, so it is possible to form the dense layer in which the surface open rate is even smaller. Moreover, the dense layer is removed by the giving step of the oiling surface so that the inside is exposed, and the surface open rate at the exposed part can be increased.

Advantageous Effects of Invention

According to the present invention, the oil is exuded from the oiling surface in which the surface open rate is larger than 10% and introduced between the sliding surface in which the surface open rate is not larger than 10% and the shaft, so that the oil film can be formed between the shaft and a sufficient amount of oil can be supplied to the sliding surface. Moreover, the oil supplied to the sliding surface is prevented from moving from the sliding surface to the inside and the friction coefficient is reduced, so that it is possible to improve sliding property as a bearing.

BRIEF DESCRIPTION OF THE DRAWINGS

FIG. 1A shows a state before processing an oiling surface; and FIG. 1B shows a state after processing the oiling surface.

DETAILED DESCRIPTION OF THE INVENTION

Below, an embodiment of an oil-retaining sintered bearing according to the present invention will be explained.

Figure 2A:
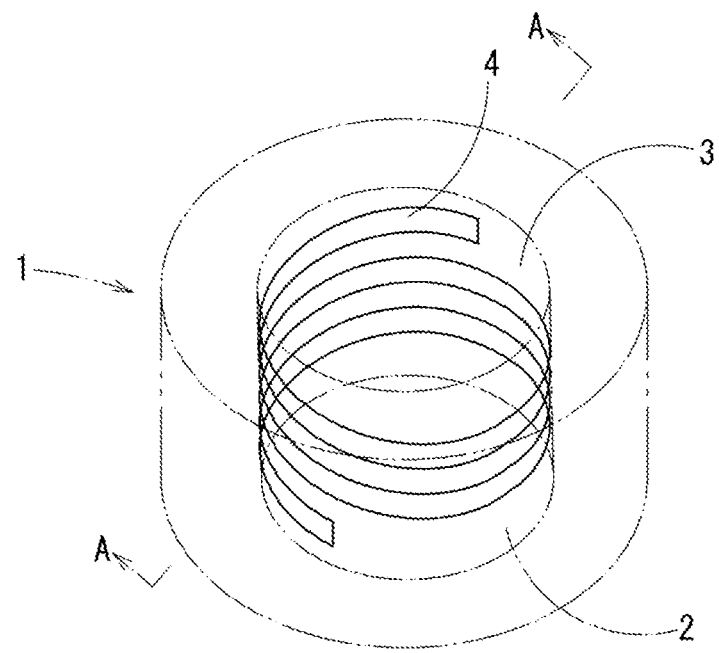
FIG. 2A is a perspective view schematically showing a helical shape of the oiling surface of the oil-retaining sintered bearing of one embodiment.
Figure 2B:
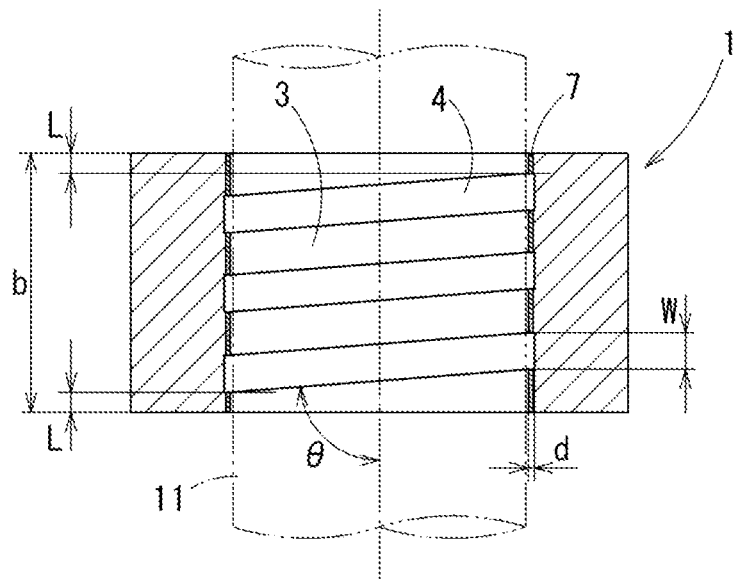
FIG. 2B is a sectional view of the inner peripheral surface of the bearing hole seen along A-A in the FIG. 2A.

An oil-retaining sintered bearing 1 is a cylindrical bearing formed from a sintered body of powder metal: as shown in FIGS. 2A and 2B, a sliding surface 3 supporting an outer peripheral surface of a shaft 11 and a recess part 4 forming a space between the outer peripheral surface of the shaft 11 are adjacently formed on an inner peripheral surface of a bearing hole 2 of it. In the present embodiment, the recess part 4 is made for forming an oiling surface, so that an inner surface of the recess part 4 is the oiling surface though; the oiling surface can be made by the other process than forming the recess part.

The bearing hole 2 holds the inserted shaft 11 rotatably, and is formed to have an inner diameter slightly larger than an outer diameter of the shaft 11: for example, a gap is 0.005 mm to 0.05 mm inclusive with respect to the shaft 11 having the outer diameter of 1 mm to 30 mm inclusive. The recess part (the oiling surface) 4 formed on the inner peripheral surface of the bearing hole 2 is helically formed in plural with a regular width W around an shaft axis except two end parts of the bearing hole 2. The recess part (the oiling surface) 4 is formed to have the width W of 0.3 mm to 4.0 mm inclusive and a depth "d" of 0.01 mm to 0.2 mm inclusive.

The inner peripheral surface of the bearing hole 2, other than the recess part (the oiling surface) 4, is the sliding surface 3 which holds the shaft 11. The oil-retaining sintered bearing 1 is formed from the sintered body of the powder metal, so that pores 6 are formed inside and the pores 6 open at a surface. In this case, the sliding surface 3 is formed of a dense layer 7 and a surface open rate of the pores 6 at the sliding surface 3 is different from that at the recess part (the oiling surface) 4; it is not larger than 10% at the sliding surface 3 and it is larger than 10% at a bottom surface of the recess part 4. The surface open rate at the sliding surface 3 is preferably 5% or lower; more desirably, 3% or lower. The surface open rate is an area ratio of opening parts of the pores 6 per unit area at the inner peripheral surface of the bearing hole 2.

The recess part (the oiling surface) 4 at the inner peripheral surface is given as follows: when an area ratio of the sliding surface to the inner peripheral surface is "a", a helical angle to the shaft axis of the bearing hole 2 is "θ", and a length of the bearing hole 2 is "b"; $\sin\theta \geq (W/((1-a) \times b))$ and also the area ratio "a" is not smaller than 0.40 and smaller than 1.0, desirably it is not smaller than 0.95, more desirably it is not smaller than 0.9. Setting dimensions to satisfy the above formula, the shaft 11 is in contact with the sliding surface 3 at (a×100) % of the length "b" of the bearing hole 2 when it is inserted into the bearing hole 2 and in contact with the inner peripheral surface thereof. As before mentioned, the two end parts of the inner peripheral surface of the bearing hole 2 are formed as the sliding surface 3 without the recess part (the oiling surface) 4.

Next, a producing method of the oil-retaining sintered bearing 1 will be explained.

Figure 3:
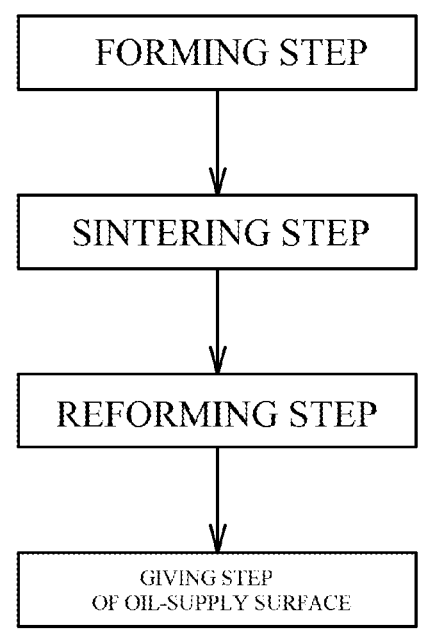
FIG. 3 is a process drawing showing a method of producing the oil-retaining sintered bearing of one embodiment.

As shown in FIG. 3, the producing method of the oil-retaining sintered bearing 1 includes a forming step of a pressurized powder body forming a cylindrical pressurized powder body by filing material powder in a forming die and pressurizing it, a sintering step sintering the pressurized powder body, a reforming step reforming an inner peripheral surface and an outer peripheral surface of the pressurized powder body after the sintering step, and a working step of an oiling surface forming the recess part (the oiling surface) on the inner peripheral surface of the pressurized powder body after reforming.

Figure 4:
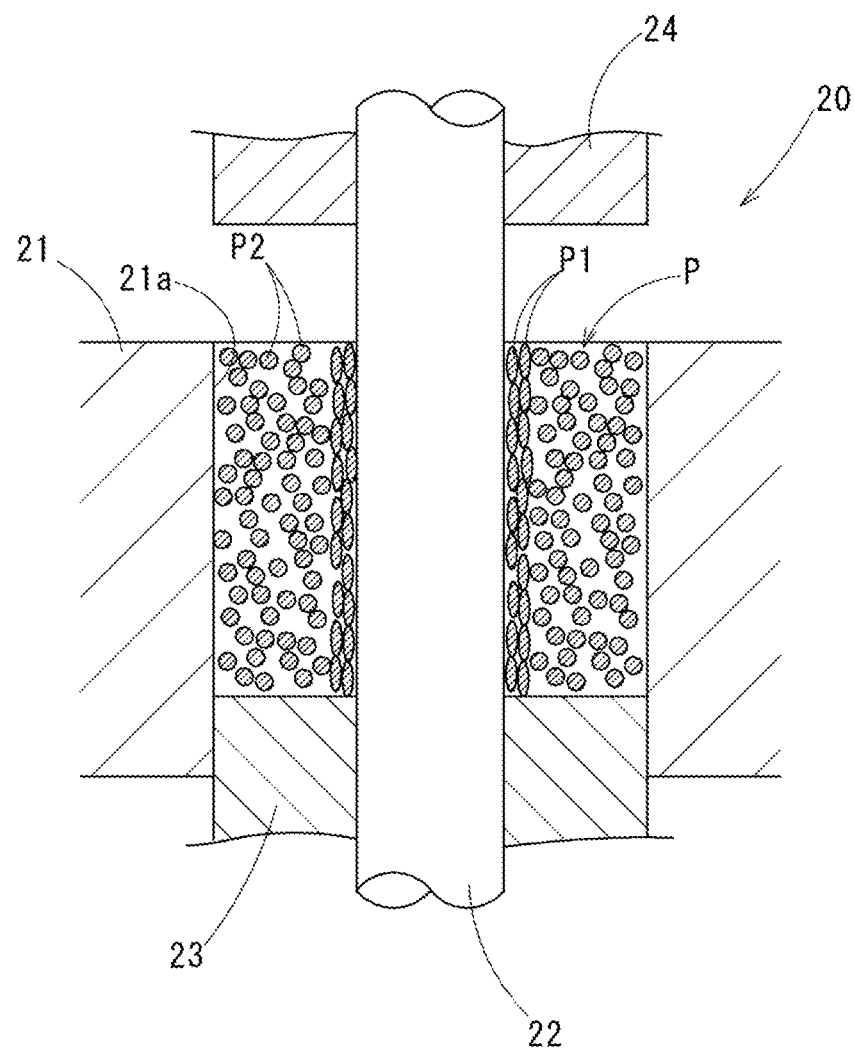
FIG. 4 is a vertical sectional view schematically showing a state in which material powder is filled in a forming die.

As shown in FIG. 4, a forming die 20 which is provided with a die plate 21, a core rod 22, a lower punch 23 and an upper punch 24 is used for the forming step. In this forming die 20, a cylindrical space is formed by a column-shaped through hole 21a formed in the die plate 21, the columnar core rod 22 inserted in a center of the through hole 21a, and the cylindrical lower punch 23 inserted upward between the through hole 21a and the core rod 22 from a bottom upwardly. Filling a prescribed amount of material powder P down into this cylindrical space from above it, inserting the upper punch 24 downward and reducing a distance between the lower punch 23 and the upper punch 24 so as to pressurize the material powder P, the pressurized powder body is formed.

Metal for material of the oil-retaining sintered bearing 1 is not specifically limited though, copper-based powder or iron-copper-based powder is suitable for the material powder P.

The copper-based powder is copper powder made of copper or copper alloy as a main ingredient; and includes low melting metal powder (e.g., tin powder) of 0.1 to 5 mass % with a melting point lower than a sintering temperature and solid lubricant of 0.5 to 5 mass % such as graphite. The low melting metal powder is melted at a temperature lower than the sintering temperature, acts as binder between iron powder and copper powder and the like in a state of liquid phase metal so as to improve mechanical strength of a sintered body, and rigidly holds the solid lubricant, so that they are prevented from falling.

The iron-copper-based powder is 15 to 80 mass % of copper powder, 0.1 to 5 mass % of the low melting metal powder, 0.5 to 5 mass % of the solid lubricant, and the balance of iron powder.

Regarding a shape of the copper powder of the material powder P, two types of powders, flat-shape powder P1 and granular powder P2, are used. Substantially spherical electrolytic copper powder or atomized copper powder and the like are used for the granular powder P2. An aspect ratio (a diameter/a thickness) of the flat-shape powder P1 is not smaller than 10; copper flakes can be used, for example. Mix ratio of the flat-shape powder P1 in the copper powder is desirably 5 mass % to 30 mass % for the copper-based powder, or 20 mass % to 60 mass % for the iron-copper-based powder. In the copper-based powder, a maximum diameter of the flat-shape powder P1 is 1 μm to 100 μm inclusive; and a mean granule size of the granular powder P2 is 5 μm to 100 μm inclusive, for example. In the iron-copper-based powder, a mean granule size of the iron powder is the same as or larger than the mean granule size of the copper powder.

Shaking the material powder P filled in the forming die 20, the flat-shape powder P1 is concentrated at an outer layer part. In a case of the copper-based powder, the flat-shape powder P1 and the granular powder P2 are densely concentrated at the outer layer part, and a ratio of the granular powder P2 is increased toward an inside. FIG. 4 schematically shows a state in which the flat-shape powder P1 is concentrated at a vicinity of an outer peripheral surface of the core rod 22.

In a case of the iron-copper-based powder, the outer layer part is rich in copper, and a ratio of iron is increased toward an inside. Accordingly, the outer layer part of the obtained pressurized powder body is a dense layer with copper.

Figure 5:
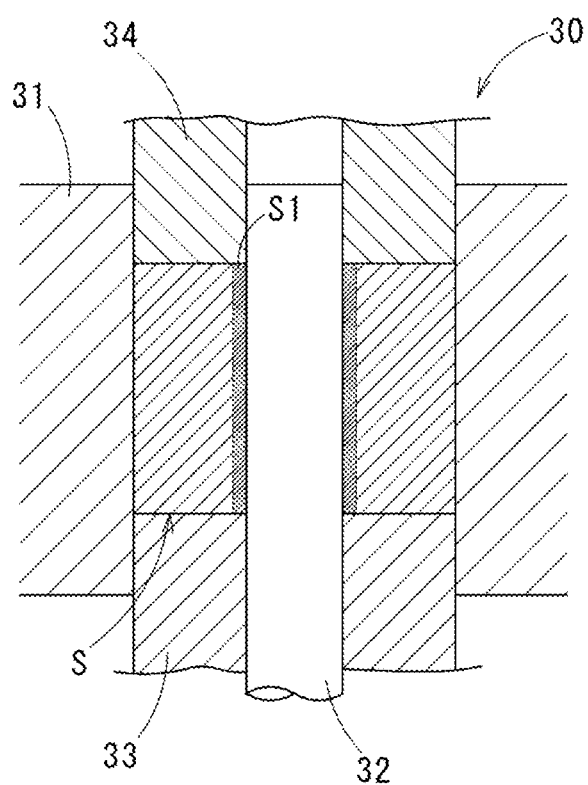
FIG. 5 is a vertical sectional view schematically showing a state in which a sintered body is inserted in a reforming die.

Next, after sintering this pressurized powder body, the pressurized powder body after sintering (hereinafter, "a sintered body S") is reformed in a reforming die. This reforming die 30 reforms an external form of the sintered body S; as shown in FIG. 5, it is provided with a die plate 31, a core rod 32, a lower punch 33 and an upper punch 34 as in the forming die 20. An inner peripheral surface of the die plate 31 and end surfaces of the lower punch 33 and the upper punch 34 which are in contact with the sintered body S are finished into smooth surfaces.

Figure 1A:
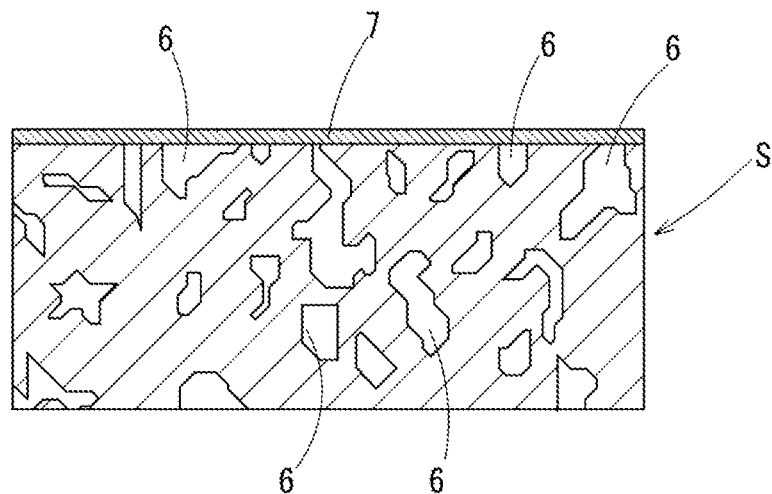
FIGS. 1A and 1B are schematically sectional views in the vicinity of an inner peripheral surface of a bearing hole of an oil-retaining sintered bearing of an embodiment according to the present invention.

Disposing the sintered body S for the reforming die 30 and pressurizing a dense layer S1 at an inner peripheral surface between the core rod 32 and both the punches 33 and 34, the sintered body S is pressurized so as to finish an outer diameter and an inner diameter to a product size. Furthermore, a soft layer of the flat-shape copper powder formed on an inner peripheral surface is rubbed with the inner peripheral surfaces of the core rod and the die plate so that it is plastically flown and the pores 6 are choked. As a result, as shown in FIG. 1A, the whole inner peripheral surface of the sintered body S is formed to be choked and becomes the still more dense layer 7.

Figure 1B:
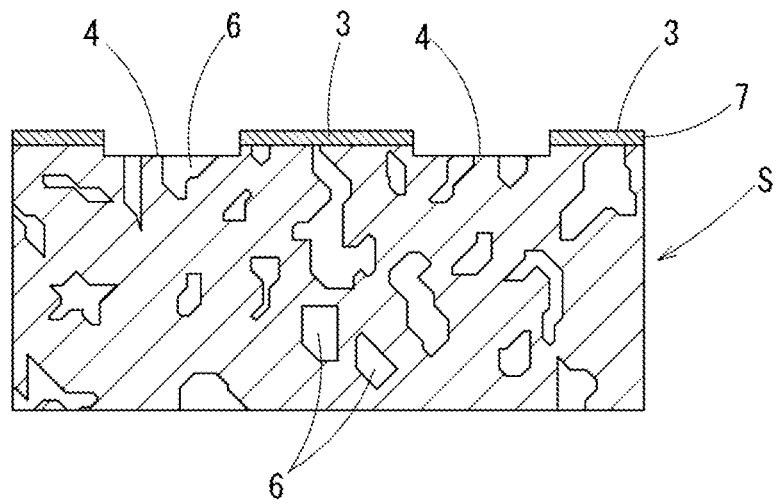

Then, as shown in FIG. 1B, the belt-shape recess part (the oiling surface) 4 is formed by cutting helically along the shaft axis on the inner peripheral surface of the sintered body S except both the end parts. A depth "d" of the recess part (oiling surface) 4 is a depth on the order of exposing a relatively rough layer inside the dense layer 7, by removing the dense layer 7 that is formed by concentrating the flat-shape powder P1 in the aforementioned forming step and choking in the reforming step. Accordingly, the surface open rate is large at the recess part (the oiling surface) 4 on the inner peripheral surface; but the surface open rate remains small at the surface other than the recess part (the oiling surface) 4 because of the dense layer 7.

Permeating with lubricant oil, the oil-retaining sintered bearing 1 is ultimately produced.

The oil-retaining sintered bearing 1 produced as above has the inner peripheral surface as the bearing hole 2 and holds the inserted shaft 11 rotatably. In this case, the recess part (the oiling surface) 4 is helically formed on the inner peripheral surface of the bearing hole 2, the other surface than the recess part (the oiling surface) 4 is the sliding surface 3 supporting the shaft 11, and a gap is formed between the bottom surface of the recess part 4 and the outer peripheral surface of the shaft 11. At the sliding surface 3, the surface open rate of the pores 6 is small as not to be larger than 10% as described above owing to the copper dense layer 7. At the recess part (the oiling surface) 4, the surface open rate is larger than 10%.

Accordingly, when the shaft 11 rotates, oil exudes from the recess part (the oiling surface) 4 and is supplied between the shaft 11 and the sliding surface 3. Since the surface open rate is small as 10% or lower at the sliding surface 3, the oil is not permeated inside and an oil film is formed between the sliding surface 3 and the shaft 11 so as to support the shaft 11. In this case, if the surface open rate at the sliding surface 3 is larger than 10%, the oil cannot be retained and is flown inside the bearing, so that the oil film between the shaft 11 and the sliding surface 3 is reduced and seizing may be incurred. Moreover, if the surface open rate at the recess part (the oiling surface) 4 is lower than 10%, it is difficult to sufficiently supply the oil from inside to the sliding surface 3.

In the present embodiment, since the oil is sufficiently supplied between the sliding surface 3 and the shaft 11, the friction coefficient is reduced by the oil film, and the sliding property can be improved.

In this case, since the recess part (the oiling surface) 4 is formed helically as mentioned above, whichever part of the inner peripheral surface of the bearing hole 2 is in contact with the shaft 11, the shaft 11 is in contact with the sliding surface 3 at (a×100) % of the length of the bearing hole 2, so that the shaft 11 can be stably supported.

Furthermore, the recess part (the oiling surface) 4 is not formed at both the end parts of the bearing hole 2 but the sliding surface 3 is formed on a whole circumference thereof. Accordingly, the oil is not leaked to both the ends of the bearing through the oiling surface, so that the oil can be efficiently supplied to the sliding surface from the recess part (the oiling surface) 4.

Preventing lack of the oil reliably by synergistic function of the above effects, the oil-retaining sintered bearing 1 is possible to show an excellent sliding property in the long term.

EXAMPLES

Test results performed for demonstrating the effect of the present invention will be explained. For the tests, iron-copper-based powder in which iron, copper, tin (low melting alloy), graphite and the like were mixed with a prescribed ratio was used as material powder. It was regulated with the mixing ratio as follows: 50 mass % of copper powder, 2 mass % of tin powder, 5 mass % of copper-phosphorus powder, 10 mass % of copper-zinc powder, 0.5 mass % of solid lubricant such as graphite or the like, and the balance of iron powder. The material powder was compression molded, and sintered at temperature of 950° C.: after the reforming step, the recess part was formed on the inner peripheral surface of the bearing hole by a cutting process. Each bearing had a length 8 mm and an inner diameter of the bearing hole (at the sliding surface) 8 mm.

Regarding each of the obtained bearings, the inner peripheral surface of the bearing hole was observed by a microscope; and an area ratio of the sliding surface to the whole inner peripheral surface of the bearing hole and the surface open rates at the sliding surface and the recess part (the oiling surface) were measured. The surface open rates of the sliding surface and the oiling surface were obtained as follows: photographing SEM images (SEI) with a magnification power of 500 at the sliding surface and the oiling surface of the bearing respectively, binarizing the images by an image analyzing software and extracting the opening parts, and then the area rate of opening parts was measured. The area rate of the opening parts was measured as follows: preparing five test pieces (bearings) for every bearings with different conditions; and photographing five viewing fields regarding the sliding surface and the oiling surfaces of the bearings respectively for obtaining the area rate of the opening parts. The surface open rate was a mean value of the respective measuring results of 25 photographing parts.

In Table 1, the recess part was not formed for No. 5, and the sliding surface was all cut at No. 6. Accordingly, the surface open rates at the bottom surface of the recess part of No. 5 and at the sliding surface of No. 6 were shown by "—" respectively.

Friction coefficients were obtained as follows: after impregnating the bearing with the lubricant oil, the shaft was inserted into the bearing hole and rotated in a state in which surface pressure shown in Table 1 was applied in a perpendicular direction orthogonal to the shaft axis; a rotation torque on the bearing was measured; and the friction coefficient was calculated from the rotation torque. Rotation number of the shaft was 12500 rpm. The friction coefficients after rotating for 30 minutes were calculated respectively.

TABLE 1

| | AREA RATIO OF SLIDING SURFACE "a" | LENGTH OF BEARING HOLE "b" (mm) | HELICAL ANGLE (degree) "θ" | WIDTH OF OILING SURFACE (mm) "W" | SURFACE OPEN RATE (%) | | FRICTION COEFFICIENT APPLIED SURFACE PRESSURE (MPa) | | | | |
|---|---|---|---|---|---|---|---|---|---|---|---|
| | | | | | SLIDING SURFACE | BOTTOM SURFACE OF RECESS PART | 0.5 | 1.0 | 2.0 | 3.0 | 5.0 |
| 1 | 0.4 | 8 | 87.2 | 0.6 | 5 | 12 | 0.04 | 0.03 | 0.03 | 0.02 | 0.03 |
| 2 | 0.5 | 8 | 84.4 | 1 | 2 | 14 | 0.05 | 0.04 | 0.03 | 0.03 | 0.02 |
| 3 | 0.6 | 8 | 67.5 | 3.2 | 4 | 16 | 0.09 | 0.07 | 0.04 | 0.03 | 0.05 |
| 4 | 0.95 | 8 | 67.5 | 0.4 | 3 | 15 | 0.08 | 0.04 | 0.04 | 0.03 | 0.02 |

TABLE 1-continued

| | AREA RATIO OF SLIDING SURFACE "a" | LENGTH OF BEARING HOLE "b" (mm) | WIDTH OF HELICAL ANGLE (degree) "θ" | WIDTH OF OILING SURFACE (mm) "W" | SURFACE OPEN RATE (%) SLIDING SURFACE | SURFACE OPEN RATE (%) BOTTOM SURFACE OF RECESS PART | FRICTION COEFFICIENT APPLIED SURFACE PRESSURE (MPa) 0.5 | 1.0 | 2.0 | 3.0 | 5.0 |
|---|---|---|---|---|---|---|---|---|---|---|---|
| 5 | 1.0 | 8 | — | 0 | 6 | — | 0.08 | 0.07 | 0.15 | 0.20 | — |
| 6 | 0.0 | 8 | — | 8 | — | 13 | 0.15 | 0.12 | 0.10 | 0.08 | 0.06 |

It can be found from the results shown in Table 1 that the test pieces 1 to 4 had the small friction coefficients in spite of the applied surface pressure and showed excellent bearing properties. Accordingly, it is preferable that the area ratio of the sliding surface be not smaller than 0.4 and smaller than 1.0.

The present invention is not limited to the above-described embodiment and various modifications may be made without departing from the scope of the present invention.

For example, the oiling surface was formed as one helical shape in the above embodiment: a plurality of oiling surfaces can be formed in the range of the area ratio "a" of the sliding surface satisfying $\sin θ ≥ (W/((1-a)×b))$.

INDUSTRIAL APPLICABILITY

It is possible to provide an oil-retaining sintered bearing in which smooth lubrication can be performed by impregnating lubricant oil therein.

REFERENCE SIGNS LIST 1 oil-retaining sintered bearing
2 bearing hole
3 sliding surface
4 recess part (oiling surface)
6 pore
7 dense layer
11 shaft
20 forming die
21 die plate
21a through hole
22 core rod
23 lower punch
24 upper punch
30 reforming die
31 die plate
32 core rod
33 lower punch
33 two punches
34 upper punch
P material powder
P1 flat-shape powder
P2 granular powder
S sintered body
S1 dense layer

The invention claimed is:

1. An oil-retaining sintered bearing comprising:
a bearing hole;
a sliding surface supporting an outer peripheral surface of a shaft; and
an oiling surface, wherein
the sliding surface and the oiling surface are adjacently formed on an inner peripheral surface of the bearing hole into which the shaft is inserted,
a surface open rate at the sliding surface is not larger than 10%,
a surface open rate at the oiling surface is larger than 10%, and
the sliding surface is formed of a dense layer in which a flat-shaped powder is concentrated.

2. The oil-retaining sintered bearing according to claim 1, wherein the oiling surface is formed helically around a shaft axis of the bearing hole.

3. The oil-retaining sintered bearing according to claim 2, wherein the sliding surface is formed at both ends of the inner peripheral surface of the bearing hole over its whole circumference.

4. The oil-retaining sintered bearing according to claim 2, wherein
when a length of the bearing hole is "b"; a helical angle of the oiling surface to the shaft axis is "θ"; a width of the oiling surface is "W"; and an area rate of the sliding surface is "a",
$\sin θ ≥ (W/((1-a) ×b))$ and
"a" is not smaller than 0.4 and smaller than 1.0.

5. A method of producing the oil-retaining sintered bearing according to claim 1, comprising:
a forming step of a pressurized powder body forming a pressurized powder body by filling and pressurizing material powder in a cylindrical space between a die plate and a core rod of a die;
a sintering step sintering the pressurized powder body;
a reforming step reforming an inner peripheral surface and an outer peripheral surface of the pressurized powder body after sintering;
a giving step of an oiling surface forming the oiling surface on the inner peripheral surface of the pressurized powder body after reforming, wherein
in the forming step of the pressurized powder body, flat-shape powder and granular powder are mixed as the material powder and filled, and pressurized in a state in which the flat-shape powder is concentrated on an outer peripheral surface of the core rod;
in the reforming step, a dense layer is formed by plastically flowing an inner peripheral surface of the pressurized powder body so as to reduce a surface open rate of the inner peripheral surface; and
in the giving step of the oiling surface, the oiling surface is formed by removing the dense layer.

* * * * *